US012615310B2

(12) United States Patent
Sivasithambaresan et al.

(10) Patent No.: US 12,615,310 B2
(45) Date of Patent: Apr. 28, 2026

(54) INTELLIGENT TELEMATICS DATA SYNCHRONIZATION

(71) Applicant: RIVIAN IP HOLDINGS, LLC, Plymouth, MI (US)

(72) Inventors: Arjuna Sivasithambaresan, San Francisco, CA (US); Sunil Karkala Bhagwath, Dublin, CA (US); Vamsi Krishna Ravulapalli, San Jose, CA (US)

(73) Assignee: RIVIAN IP HOLDINGS, LLC, Plymouth, MI (US)

( * ) Notice: Subject to any disclaimer, the term of this patent is extended or adjusted under 35 U.S.C. 154(b) by 679 days.

(21) Appl. No.: 17/886,282

(22) Filed: Aug. 11, 2022

(65) Prior Publication Data

US 2023/0073566 A1 Mar. 9, 2023

Related U.S. Application Data

(60) Provisional application No. 63/239,582, filed on Sep. 1, 2021.

(51) Int. Cl.
| | |
|---|---|
| *H04L 67/12* | (2022.01) |
| *G06F 16/25* | (2019.01) |
| *G06F 16/27* | (2019.01) |
| *H04L 47/24* | (2022.01) |
| *H04W 4/44* | (2018.01) |

(52) U.S. Cl.
CPC ............ *H04L 67/12* (2013.01); *G06F 16/258* (2019.01); *G06F 16/27* (2019.01); *H04L 47/24* (2013.01); *H04W 4/44* (2018.02)

(58) Field of Classification Search
CPC ....... H04L 67/12; H04L 47/24; G06F 16/258; G06F 16/27; H04W 4/44; G07C 5/008
See application file for complete search history.

(56) References Cited

U.S. PATENT DOCUMENTS

| | | | |
|---|---|---|---|
| 10,085,137 B1 | 9/2018 | Dollinger et al. | |
| 2009/0170537 A1* | 7/2009 | Mauti, Jr. ............... | H04L 67/06 455/466 |
| 2019/0130767 A1* | 5/2019 | Letsu-Dake ........... | G07C 5/008 |
| 2020/0137142 A1* | 4/2020 | Salles ..................... | H04L 67/10 |
| 2020/0359181 A1* | 11/2020 | Kusumoto .............. | H04W 4/44 |
| 2022/0011120 A1* | 1/2022 | St. Romain ...... | G08G 1/096741 |

(Continued)

FOREIGN PATENT DOCUMENTS

| | | |
|---|---|---|
| CN | 1825874 A | 8/2006 |
| CN | 102932438 A | 2/2013 |
| CN | 104580469 A | 4/2015 |

(Continued)

*Primary Examiner* — Robert C Scheibel

(74) *Attorney, Agent, or Firm* — HG LAW LLP

(57) ABSTRACT

Systems and methods are provided to upload data from a vehicle to a network server. Vehicle data associated with the vehicle is collected and a determination of whether the vehicle data has a higher prioritization level or a lower prioritization is made. When the vehicle data is data having the higher prioritization level, upload of the vehicle data to the network server is facilitated. When the vehicle data is data having the lower prioritization level and an emergency state of the vehicle is active, upload of the vehicle data to the network server is facilitated.

20 Claims, 7 Drawing Sheets

(56)     References Cited

U.S. PATENT DOCUMENTS

2022/0169282  A1*   6/2022  Gan .................. B60W 60/0015
2022/0230480  A1*   7/2022  Atungsiri ................. G07C 5/08

FOREIGN PATENT DOCUMENTS

CN          104618479  A      5/2015
CN          107749193  A      3/2018
CN          112445183  A      3/2021
CN          113535426  A     10/2021
WO     WO-2019040043  A1 *   2/2019   ............ B60N 2/002

* cited by examiner

700 ⌐

INTELLIGENT TELEMATICS DATA SYNCHRONIZATION

CROSS-REFERENCE TO RELATED APPLICATION

This application claims priority to U.S. Provisional Patent Application No. 63/239,582, filed on Sep. 1, 2021, the entire contents of which are hereby expressly incorporated by reference herein in their entirety.

INTRODUCTION

As vehicles become increasingly connected and the number of connected consumer and fleet vehicles grows, the number of vehicles on the road at any time and collecting and sending data (e.g., telemetry data) to remote systems also increases. The present disclosure is directed to managing the transmission of data to reduce network congestion while also meeting data requirements.

SUMMARY

It is advantageous to provide systems and methods that manage the storage and upload of data collected at a vehicle to a networked server (e.g., the cloud). For example, in accordance with the present disclosure, a vehicle may be provided with a telematics control module (TCM) that implements a data policy for aggregating and intelligently uploading data to reduce network congestion and cloud computing resources, while still enabling the immediate upload of certain types of data when necessary. For example, the TCM may upload only certain data to the networked server in real time, while processing and aggregating other data to be uploaded at a scheduled time or in response to a predetermined event. By intelligently processing, aggregating, and uploading data according to a data policy, network congestion may be reduced and cloud computing resources may be effectively managed.

In some embodiments, a method of uploading data from a vehicle to a network server associated with an entity (e.g., managing the vehicle or vehicle data) is provided. The method includes collecting, by one or more processors of the vehicle, vehicle data associated with the vehicle and determining, by the one or more processors, whether the vehicle data has a higher prioritization level or a lower prioritization level. In response to determining that the vehicle data has the higher prioritization level, the method includes facilitating, at the vehicle, upload of the vehicle data to the network server. In response to determining that the vehicle data has the lower prioritization level and an emergency state of the vehicle is active, the method includes facilitating, at the vehicle, upload of the vehicle data to the network server.

In some embodiments, the method may include, in response to determining that the vehicle data has the lower prioritization level and the emergency state of the vehicle is not active: converting, by one or more modules associated with the vehicle, the vehicle data to formatted data; identifying an upload condition for uploading the formatted data to the network server; and in response to the upload condition being identified, facilitating upload of the formatted data to the network server.

In some embodiments, the method may further include analyzing, by the one or more modules associated with the vehicle, the vehicle data to determine a subset of the vehicle data that can be aggregated and converted to the formatted data.

In some embodiments, formatted data may consume less memory than the collected vehicle data.

In some embodiments, the upload condition may be a scheduled time or when the vehicle is connected to the network server by Wi-Fi.

In some embodiments, determining that the emergency state of the vehicle is active may include determining that hazard lights of the vehicle are turned on, that the vehicle is in a safe state, or that a battery management system of the vehicle is in a safe state.

In some embodiments, the vehicle data having the higher prioritization level may be notification data to be displayed on a mobile device associated with the vehicle, the vehicle data having the lower prioritization level may be log data to be stored in a time-series database.

In some embodiments, facilitating the upload of the vehicle data to the network server in response to determining that the vehicle data has the higher prioritization level may include facilitating the upload of the vehicle data over a cellular connection.

In some embodiments, facilitating the upload of the formatted data to the network server may include facilitating the upload of the formatted data over a Wi-Fi connection.

In some embodiments, a system is provided. The system includes a memory storing instructions, and control circuitry configured to execute the instructions stored in the memory to collect vehicle data associated with a vehicle and determine whether the vehicle data has a higher prioritization level or a lower prioritization level. In response to determining that the vehicle data has the higher prioritization level, the control circuitry is configured to facilitate upload of the vehicle data to a network server. In response to determining that the vehicle data has the lower prioritization level and an emergency state of the vehicle is active, the control circuitry is configured to facilitate upload of the vehicle data to the network server.

In some embodiments, the control circuitry may be further configured, in response to determining that the vehicle data has the lower prioritization level and the emergency state of the vehicle is not active, to: convert the vehicle data to formatted data; identify an upload condition for uploading the formatted data to the network server; and in response to the upload condition being identified, facilitate upload of the formatted data to the network server.

In some embodiments, the control circuitry may be further configured to analyze the vehicle data to determine a subset of the vehicle data that can be aggregated and converted to the formatted data. In some embodiments, the formatted data may consume less memory than the collected vehicle data.

In some embodiments, the upload condition may be a scheduled time or when the vehicle is connected to the network server by Wi-Fi.

In some embodiments, the control circuitry may be configured to determine that the emergency state of the vehicle is active by determining that hazard lights of the vehicle are turned on, that the vehicle is in a safe state, or that a battery management system of the vehicle is in a safe state.

In some embodiments, the vehicle data having the higher prioritization level may be notification data to be displayed on a mobile device associated with the vehicle, and the vehicle data having the lower prioritization level may be log data to be stored in a time-series database.

In some embodiments, the control circuitry may be configured to facilitate the upload of the vehicle data to the network server, in response to determining that the vehicle data has the higher prioritization level, by facilitating the upload of the vehicle data over a cellular connection.

In some embodiments, the control circuitry may be configured to facilitate the upload of the formatted data to the network server by facilitating the upload of the formatted data over a Wi-Fi connection.

In some embodiments, a non-transitory computer-readable medium having non-transitory computer-readable instructions encoded thereon is provided. The non-transitory computer-readable instructions, when executed by control circuitry, cause the control circuitry to collect vehicle data associated with a vehicle and determine whether the vehicle data has a higher prioritization level or a lower prioritization level. In response to determining that the vehicle data has the higher prioritization level, the instructions further cause the control circuitry to facilitate upload of the vehicle data to a network server. In response to determining that the vehicle data has the lower prioritization level and an emergency state of the vehicle is active, the instructions further cause the control circuitry to facilitate upload of the vehicle data to the network server.

In some embodiments, in response to determining that the vehicle data has the lower prioritization level and the emergency state of the vehicle is not active, the instructions may further cause the control circuitry to: convert the vehicle data to formatted data; identify an upload condition for uploading the formatted data to the network server; and in response to the upload condition being identified, facilitate upload of the formatted data to the network server. In some embodiments, the formatted data may consume less memory than the collected vehicle data.

In some embodiments, the upload condition may be a scheduled time or when the vehicle is connected to the network server by Wi-Fi.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

Figure 1:
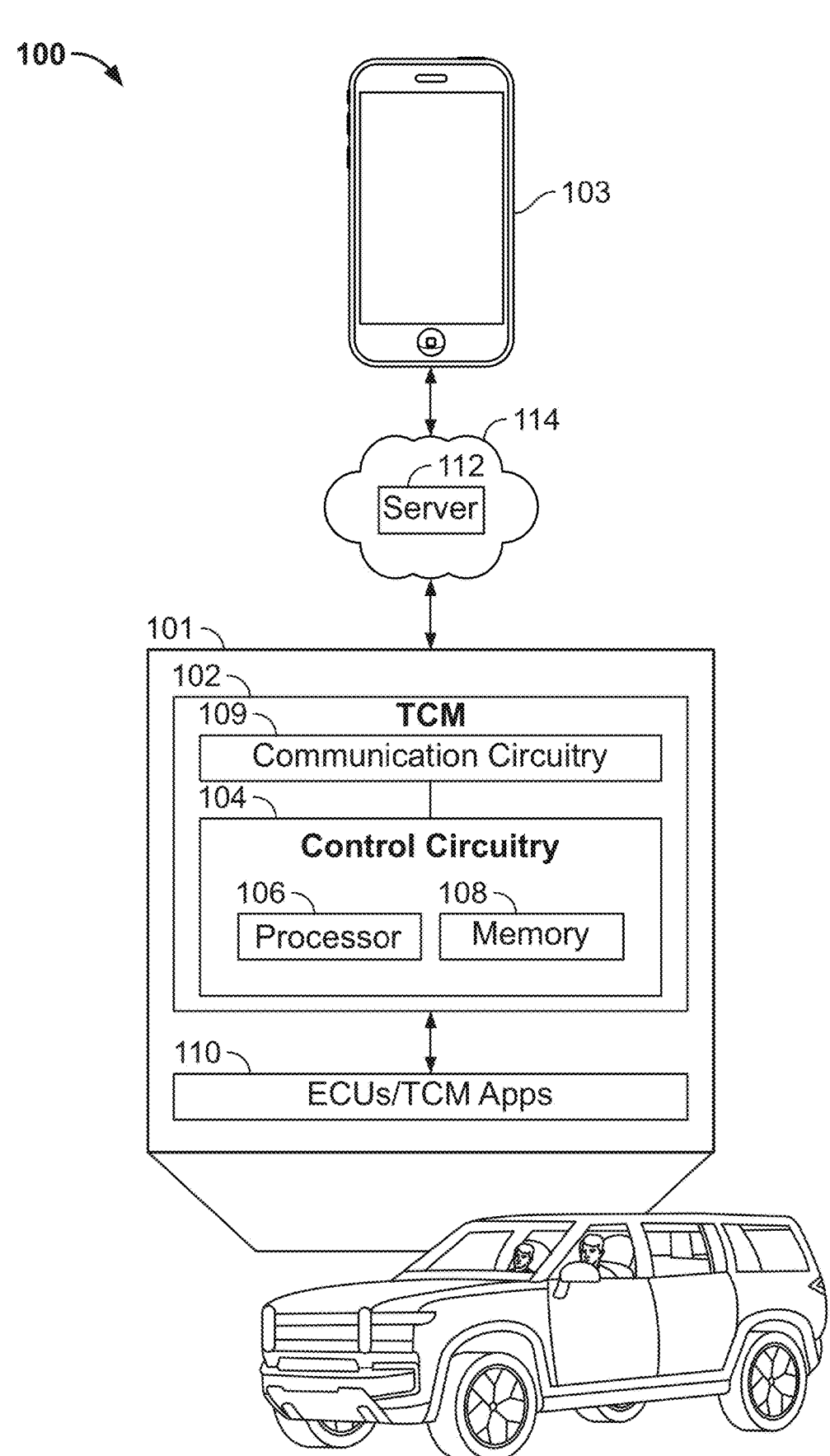
FIG. 1 is a simplified block diagram of aspects of a connected vehicle system architecture, in accordance with some embodiments of the present disclosure.

FIG. 1 is a simplified block diagram of aspects of a connected vehicle system architecture 100, in accordance with some embodiments of the present disclosure. As shown, the system architecture 100 includes a vehicle 101 having a telematics control module (TCM) 102 (or telematics control unit TCU) in communication with a server 112 associated with an entity (e.g., an entity associated with the manufacture or operator of vehicle 101, an entity handling data management of the vehicle 101, etc.). Although only a single server is shown, it should be understood that the server 112 may be a plurality of networked servers (e.g., represented by cloud 114). Additionally, in some embodiments, the server 112 may host a cloud-based object storage bucket (e.g., an AMAZON WEB SERVICES (AWS) S3 bucket). As described in greater detail below, the TCM 102 is configured to collect data from the vehicle 101 (e.g., from electronic control units (ECUs) and TCM apps 110) and upload this data to server 112. For convenience in description, this data upload system may be referred to as a V2C file upload system. As shown, a mobile device 103 may also be in communication with the server 112. As described in greater detail below, the mobile device 103 may be configured to request and receive vehicle status updates from the server 112.

As shown, the TCM 102 may include control circuitry 104 (e.g., including a processor 106 and memory 108) and communication circuitry 109. The processor 106 may comprise a hardware processor, a software processor (e.g., a processor emulated using a virtual machine), or any combination thereof. In some embodiments, the processor 106 and memory 108 in combination may be referred to as the control circuitry 104. In some embodiments, the processor 106 alone may be referred to as the control circuitry 104. The memory 108 may comprise hardware elements for non-transitory storage of commands or instructions, that, when executed by the processor 106, cause the processor 106 to act in accordance with embodiments described above and below. As referred to herein, the control circuitry 104 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, the control circuitry 104 may be distributed across multiple separate processors or processing units, for example, multiple of the same type of processing units (e.g., two Intel Core i7 processors) or multiple different processors (e.g., an Intel Core i5 processor and an Intel Core i7 processor). The communication circuitry 109 may provide vehicle connectivity to the server 112 via a plurality of different networks and network providers (e.g., cellular, private cellular, Wi-Fi, satellite, open roaming, etc.) and upload certain data to the server 112, as described in further detail below.

Figure 2:
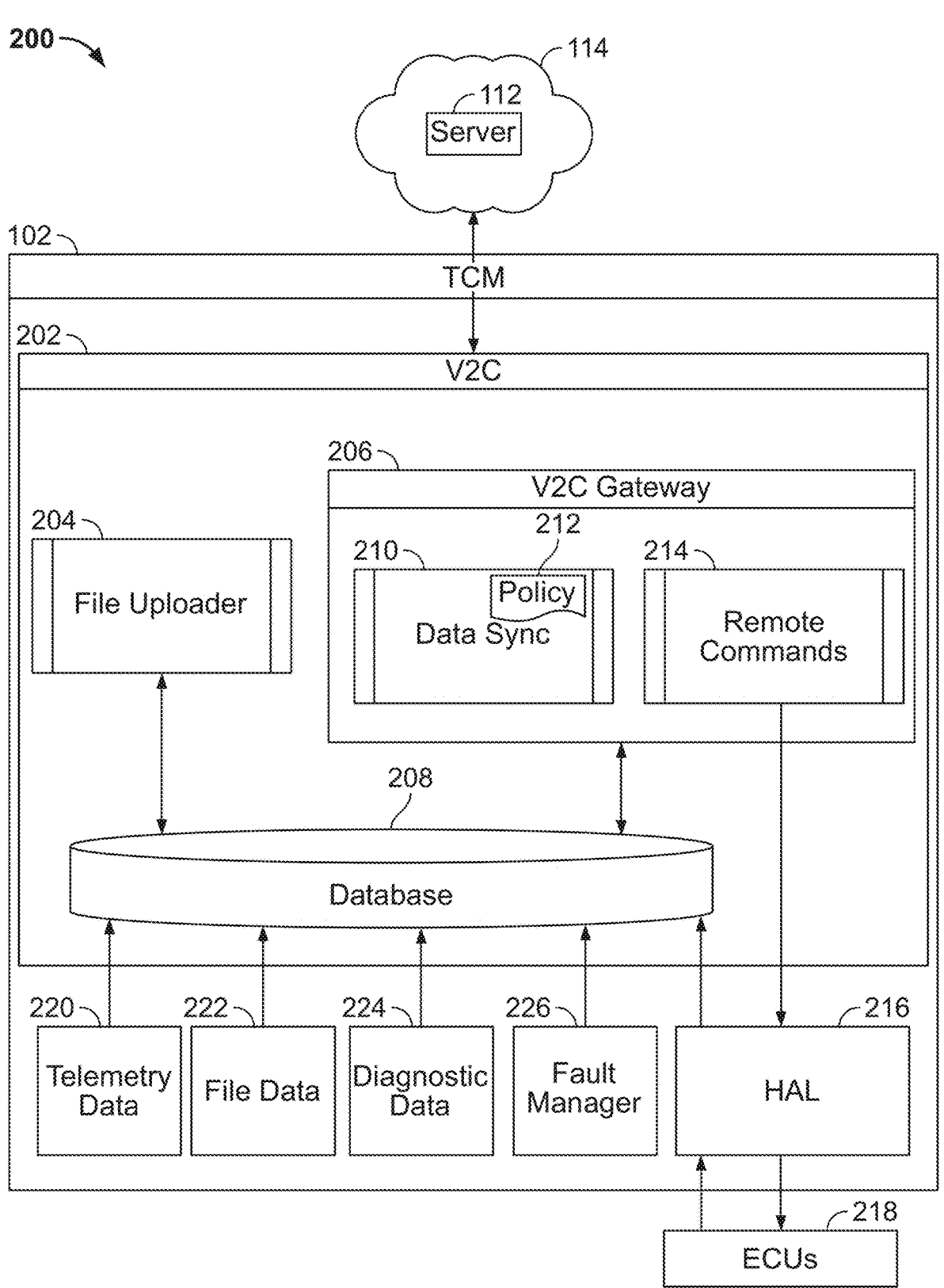
FIG. 2 is a simplified block diagram of aspects of a vehicle-to-cloud (V2C) file upload system architecture, in accordance with some embodiments of the present disclosure.

FIG. 2 is a simplified block diagram of aspects of a V2C file upload system architecture 200, in accordance with some embodiments of the present disclosure. As shown, the system architecture 200 includes a V2C module 202 implemented by the TCM 102 and configured to collect and upload data to the server 112. In some embodiments, the V2C module 202 includes a database 208, a file uploader 204, and a V2C gateway 206. As shown, the V2C gateway 206 may include a data sync module 210, which implements a data policy 212 (e.g., an upload policy) to optimize computing resources and reduce communications between the vehicle 101 and the cloud 114, and a remote commands module 214. The V2C module 202 may continuously collect different vehicle data from the vehicle 101 (e.g., by ECUs and sensors of the vehicle) and store this collected data in the database 208. For example, the V2C module 202 may collect and store telemetry data 220 (e.g., ECU messages, GPS data, etc.), file data 222 (e.g., videos captured by the vehicle 101, journal logs, etc.), and diagnostic data 224. The database 208 may also receive and store fault data (e.g., a fault notification) from fault manager module 226. The file uploader 204 periodically monitors the database 208 to check for new files that need to be uploaded to the server 112. In some embodiments, to upload files to a cloud-based object storage bucket hosted in the cloud 114 (e.g., by the server 112) and associated with the vehicle 101, the file uploader 204 may request a pre-signed URL from the cloud-based object storage bucket. The file uploader 204 may then upload the files (multipart) to the cloud-based object storage bucket using the pre-signed URL. The file uploader 204 may update the data sync module 210 with metadata that was uploaded to the cloud-based object storage bucket. In some embodiments, the metadata may be synced via a store and forward method, as described in greater detail below. The file uploader 204 may selectively upload data stored in the database 208 according to the data policy 212, as described in greater detail below.

The data policy 212 may implement an upload policy for managing the processing and uploading of collected data based on a number of factors including the type of data, detected events, the type of connection between the V2C module 202 and the server 112, network congestion, etc. For example, once an event (e.g., a hazard, a collision, or the vehicle 101 parked at home and connected to Wi-Fi) is detected by the V2C module 202, the V2C module 202 may determine whether certain types of data should be aggregated and synthesized and uploaded to the server 112 at a later time, or whether data should be immediately uploaded to the server 112 with little or minimal processing (e.g., non-aggregated, non-synthesized data). For example, the V2C module 202 may determine that the speed of the vehicle 101 does not need to be uploaded in real time or near real time (e.g., as or immediately after the data is captured). Instead, the V2C module 202 may aggregate and synthesize the data to instead represent a summary of each drive segment as, e.g., a color—green/yellow/red representing an average speed along that drive segment (e.g., fast, average, or slow). At the end of the day (e.g., when the vehicle 101 is connected to Wi-Fi) or at a scheduled time based on a user profile, the V2C module 202 may upload the aggregated data. In this way, network congestion may be reduced. Additionally, because processing and aggregation is performed by the V2C module 202, cloud computing resources (e.g., of the cloud 114) may be conserved. For convenience in description, captured data that has not been aggregated, synthesized, or compressed (e.g., non-aggregated, non-synthetized data), may be referred to as raw data. In some embodiments, raw data may be minimally processed during capture or storage by V2C module 202.

In some embodiments, it may be advantageous to immediately upload critical information in real-time without waiting for the vehicle 101 to be connected to the server 112 by Wi-Fi (e.g., or other low-cost, high-bandwidth connection such as a wired connection or private LTE connection). In some embodiments, the V2C module 202 may also intelligently determine when the data is sent (e.g., based on the prioritization level of the data) to the server 112 given the driver's previous driving behavior (e.g., the driver usually parks in garage and stops driving on Tuesday at 5 pm or has sports/kids events on Wednesday evenings after work). That is, the data policy 212 may specify how certain types of vehicle data are processed locally and how only certain types of aggregated data are sent to the server 112 for analysis, which can be sent over lower speed networks (e.g., cellular vs. Wi-Fi), instead of sending the raw data (e.g., non-aggregated, non-synthesized, or uncompressed data) to the server 112.

In some embodiments, certain low-bandwidth, time-sensitive data (e.g., data having a higher prioritization level) may always be sent to the server 112, regardless of the current type of connection between the V2C module 202 and the server 112 (e.g., over cellular or Wi-Fi). For example, data such as door open, trunk open, etc., may be immediately uploaded to the server 112 so it can be quickly transmitted to and displayed on the user's mobile device (e.g., the mobile device 103). In some embodiments, certain types of low-fidelity data (e.g., captured by a low-fidelity capture) having a lower prioritization level may be uploaded to the server 112 in response to a request from the mobile device 103. However, certain data captured by high-fidelity capture (e.g., PCAPs, journal logs, log data to be stored in a time-series database, etc.) having a lower prioritization level may be scheduled to be uploaded to the server 112 when the V2C module 202 is connected to the server 112 by Wi-Fi unless an emergency state is detected. For example, in an emergency state, it may be advantageous to immediately upload certain raw data to the server 112, even if Wi-Fi is not available (e.g., over cellular). In one example, certain raw data may be uploaded immediately when the vehicle's hazard lights are turned on, when the vehicle enters a safe state (e.g., due to a detected crash, damage, malfunction, etc.), or when the battery management system (BMS) enters a safe state (e.g., due to temperature, current, or voltage warning, thermal event, etc.). The uploaded data may include data that was stored by the V2C module 202 before the event was detected (e.g., 10 minutes before the event was detected).

In some embodiments, certain types of data may be aggregated by the V2C module 202 before it is uploaded to the server 112. For example, the V2C module 202 may continuously track the miles driven (e.g., once per second). However, instead of uploading this raw data in real-time (or near real-time) to the server 112 (e.g., as high-fidelity data), the V2C module 202 may aggregate and process this data (e.g., one value representing all the miles driven in the past day). This aggregation and processing of data at the V2C module 202 may be referred to as local edge computing. The aggregated and processed data may then be uploaded to the server 112 at a predetermined interval (e.g., once per day), regardless of the type of connection between the V2C module 202 and the server 112. In some embodiments, if the V2C module 202 is connected to the server 112 by Wi-Fi within a threshold time of a scheduled upload (e.g., 1 hour), the V2C module 202 may upload the raw data to the server 112. In some embodiments, upload times may be based on a user profile or network traffic/available cloud resources. For example, a scheduled upload may be delayed to a time when more cloud resources are available. In some embodiments, data may be uploaded (or only periodically uploaded or not uploaded at all) based on a user's settings (e.g., privacy settings or app settings). In some embodiments, data may be uploaded in response to a request or action by a user. For example, in response to a user opening an application associated with the vehicle 101 or requesting data through the application (e.g., a live feed from cameras in the vehicle 101), as described in further detail below. In some embodiments, the upload frequency of certain data (e.g., low-fidelity data) may be based on the current network congestion or available cloud resources. In some embodiments, data upload or data upload frequency may be based in part on a comparison of the signal strength of a Wi-Fi network and the signal strength of a cellular network, as well as a determination of whether the bandwidth of the server 112 is above a certain threshold level (e.g., the current server upload speed is below 5 Mbps, etc.).

The remote command module 214 may process remote commands such as door lock/unlock commands, pre-conditioning commands, enrollment/user profiles requests, etc. (e.g., from the mobile device 103 of FIG. 1) and interface with systems and ECUs 218 of the vehicle 101 through a hardware abstraction layer (HAL) 216, as explained in further detail below. It should be understood that the modules may be implemented by software, hardware, or any combination thereof and may perform the functions described herein.

Figure 3:
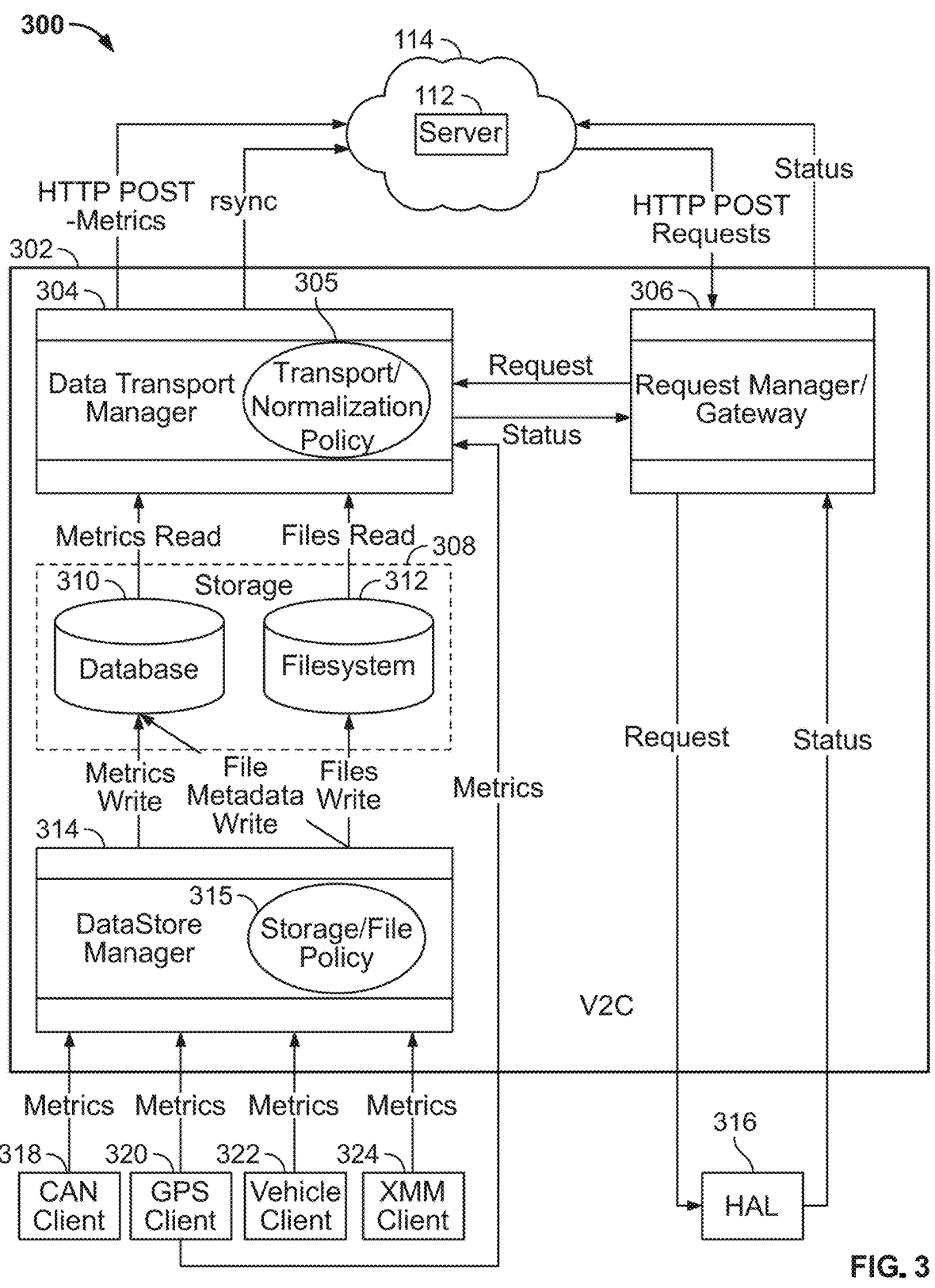
FIG. 3 is a block diagram of aspects of a V2C system architecture, in accordance with some embodiments of the present disclosure.

FIG. 3 is a block diagram of aspects of a V2C system architecture 300, in accordance with some embodiments of the present disclosure. As shown, the system architecture 300 includes a V2C module 302 configured to collect and upload data to the server 112. As similarly described above with reference to FIG. 2, the V2C module 302 may be implemented by the TCM 102. In one embodiment, the V2C module 302 includes a data transport manager (DTM) 304, a request manager/gateway (RMG) 306, a storage 308, and a data store manager (DSM) 314. Although the V2C module 302 and the V2C module 202 are separately illustrated and described, it should be understood that the V2C module 302 and the V2C module 202 may implement some or all of the same functions described above and below.

The storage 308 may store two types of data—telemetry data (metrics data) and file data (e.g., audio files, camera frames, etc.). In some embodiments, file data may be stored on the storage as individual files in file system database 312. In some embodiments, because telemetry data is related to occurrences in the vehicle 101 at different points in time, telemetry data may be stored in a time-series database optimized for timestamp queries (e.g., database 310). For example, as shown below in table 1, GPS data may be associated with a timestamp.

TABLE 1

| Time | Latitude | Longitude |
| --- | --- | --- |
| 1600462722000 | 40.7456 | −72.1567 |
| 1600462723000 | 40.7456 | −72.2458 |

In some embodiments, the data may be, e.g., an integer or a floating-point. The data may include a state of an autonomous control module (ACM) of the vehicle 101, a state of a battery management system (BMS) of the vehicle, miles driven, the type of miles driven (e.g., highway), etc. In some embodiments, based on a data policy, certain data may be specified for aggregation, certain data may be stored in association with an upload priority, etc.

The DSM 314 may subscribe to different client messaging topics (e.g., topics may be a configuration parameter) and store metrics data it sends in the database 310. The DSM 314 may also receive file data and store the received file data in file system database 312. The DSM 314 may also store file metadata in the storage 308 (e.g., in the database 310). In some embodiments, the DSM 314 may store all received data on the TCM 102 storage. However, in some embodiments, the DSM 314 may also implement a data policy (e.g., storage/file policy 315) to file or offload certain data having a low importance to save storage space. The DSM 314 may support batching of data from multiple clients (e.g., controller area network (CAN) client 318, GPS client 320, vehicle client 322, experience management module (WM) client 324). In some embodiments, the DSM 314 may subscribe to multiple clients using a messaging layer. In some embodiments, for serialization/deserialization of data over wire, Protocol Buffers (i.e., a cross-platform data format used to sterilize structured data—"Protobuf") may be used. However, this is only one example, and any suitable format may be used.

The DTM 304 may be responsible for managing the data that needs to be sent to the server 112. The DTM 304 may have a real-time mode of operation and a storage mode of operation. In the real-time mode, some of the real-time metrics (e.g., GPS data, critical faults in the system are sent immediately to the server 112 without any storage overhead), and the DTM 304 may directly subscribe to these messages and stream the data to the server 112. In the storage mode, the DTM 304 may read the metrics data from the database 310 and files from the file system database 312 and send it to the server 112, based on a transport policy (e.g., transport/normalization policy 305). For example, the DTM 304 may constantly query data from the storage 308 in accordance with the data transport policy to send to the server 112. Queries may be timestamp-based, and the DTM 304 will keep track of the last acknowledged timestamp from the server 112. In some embodiments, data read from the storage 308 may be added to one of three priority queues—high priority queue, medium priority queue, and low priority queue, in accordance with the priority defined in the transport/normalization policy 305. As the names suggest, data in the high-priority queue will be processed first, followed by data in the medium and low-priority queues. To accelerate the transport process, a thread pool may constantly send data to the server 112. Real-time metrics data may be stored in a circular buffer, and a dedicated thread may keep sending this data to the server 112. In some embodiments, low-latency, high-throughput, real-time metrics data will not wait for an acknowledgment (ack) from the server 112 and may constantly keep draining the circular buffer. If an LTE connection between the TCM 102 and the server 112 fails, the data may be lost, but the server 112 may eventually get data from the high-priority queue. For event-based transport, the DTM 304 may receive a request from the server 112 and send certain data triggered by select events. For most event-based requests, the DTM 304 may tag the data in the storage 308 so that the server 112 will be able to pull relevant data based on the tag.

To transport file data, the DTM 304 may continuously monitor a folder (e.g., a folder in cloud-based object storage bucket) in the host file system. Whenever a new file is added to the folder, it will be synced (e.g., using rsync). The folder may include a plurality of subfolders for different types of data. For example, the folder may include an audio files subfolder, a camera frames subfolder, and a log files subfolder.

Different vehicles may include different signal names coming from the database file, and it may be advantageous for the server 112 to have a common format so that the server 112 can interpret data regardless of the vehicle it was received from. To do this, a normalization feature may be implemented (e.g., according to the transport/normalization policy 305). In one embodiment, the DTM 304 may perform normalization after reading data from the storage 308 but before sending the data to the server 112 (e.g., to preserve the signal in raw format in the storage 308). In another embodiment, the DTM 304 may send raw data to the server 112 and the server 112 may perform normalization based on the vehicle type. In another embodiment, the DSM 314 may perform normalization before storing data in the storage, which may simplify the logic of the DSM 314.

The RMG 306 may receive commands from the server 112, check if a user is authorized to run commands/requests, publish the command on a topic, subscribe to a command static topic, and send status information back to the server 112 (e.g., through HAL 316). The V2C 302 may receive different types of commands/requests such as sending particular data stored in the storage 308 at certain timestamps, commands from the vehicle 101 to do certain operations (e.g., directly from the server 112 or from the phone), update a configuration file (e.g., a data policy), etc. In some embodiments, as shown in FIG. 4, the server 112 may process command requests and send them to the HAL 316.

Figure 4:
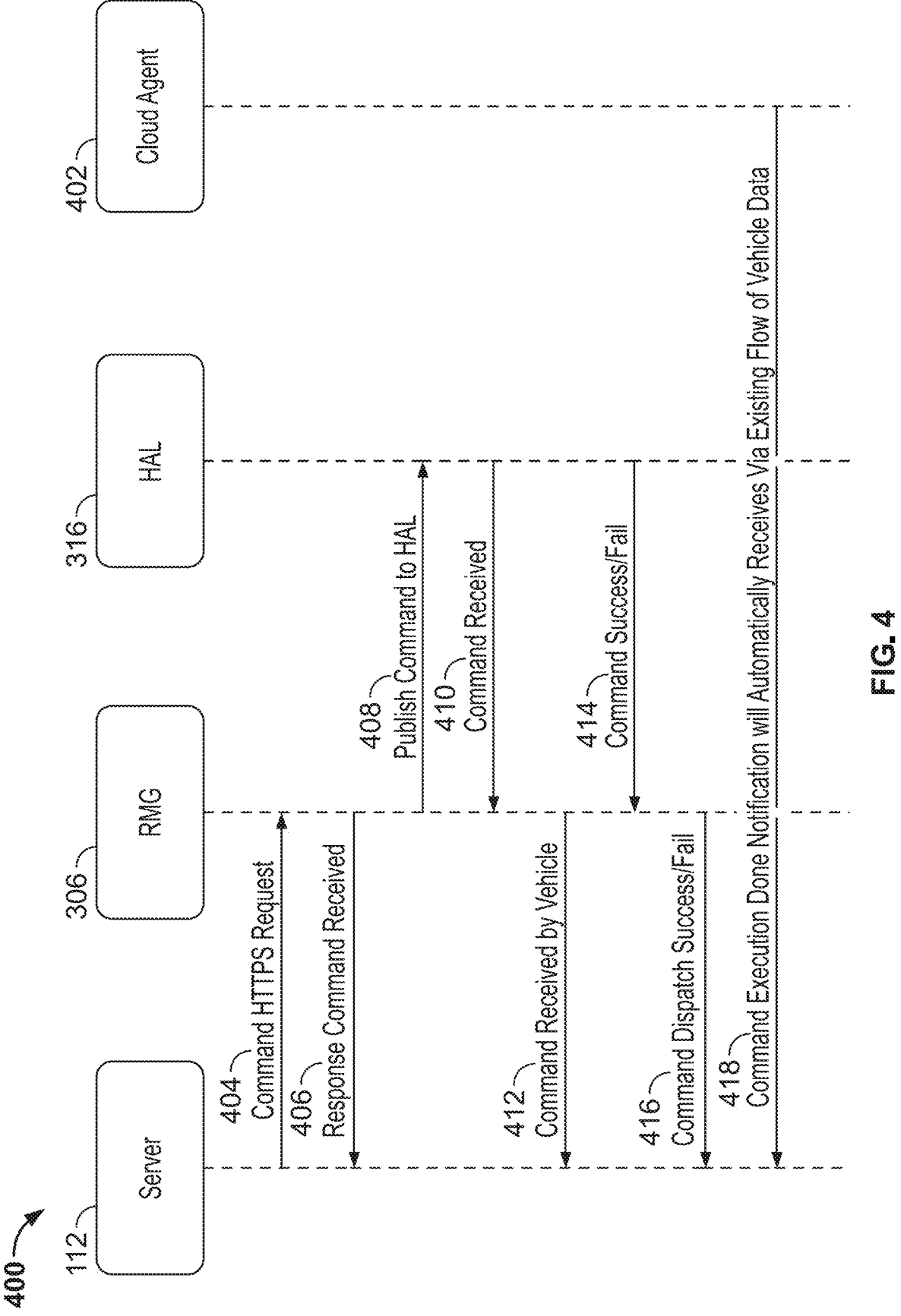
FIG. 4 is a block diagram representing transmission of data related to a received command, in accordance with some embodiments of the present disclosure.

FIG. 4 is a block diagram 400 representing transmission of data related to a received command, in accordance with some embodiments of the present disclosure. Although the RMG 306 of the V2C module 302 of FIG. 3 is described, it should be understood some or all of the functions described below may be implemented by the V2C module 202 of FIG. 2. As shown, the server 112 may send a command HTTPS request 404 to the RMG 306. The command HTTPS request 404 may be a command or request to perform a particular operation at the vehicle 101 (e.g., preheat the interior, update a configuration file, etc.). Although FIG. 4 is described with reference to an HTTP protocol, it should be understood that any suitable protocol (e.g., a MQTT protocol) may be used. The RMG 306 may send an acknowledgment 406 to the server 112 and publish the command to the HAL 316 (message 408). The HAL 316 may send an acknowledgment 410 to RMG 306 and the RMG 306 may relay this message to the server 112 (indicating that the command has been received by the vehicle) (message 412). The HAL 316 may then report the success or failure of the command to the RMG 306 (message 414) and the RMG may relay this message to the cloud (message 416). A notification 418 indicating that the command execution is complete may be automatically received by the server 112 via the existing flow of vehicle data to the server 112 via a cloud agent associated with the vehicle 101 (e.g., cloud agent 402)—or implemented via other V2C functionality.

Figure 5:
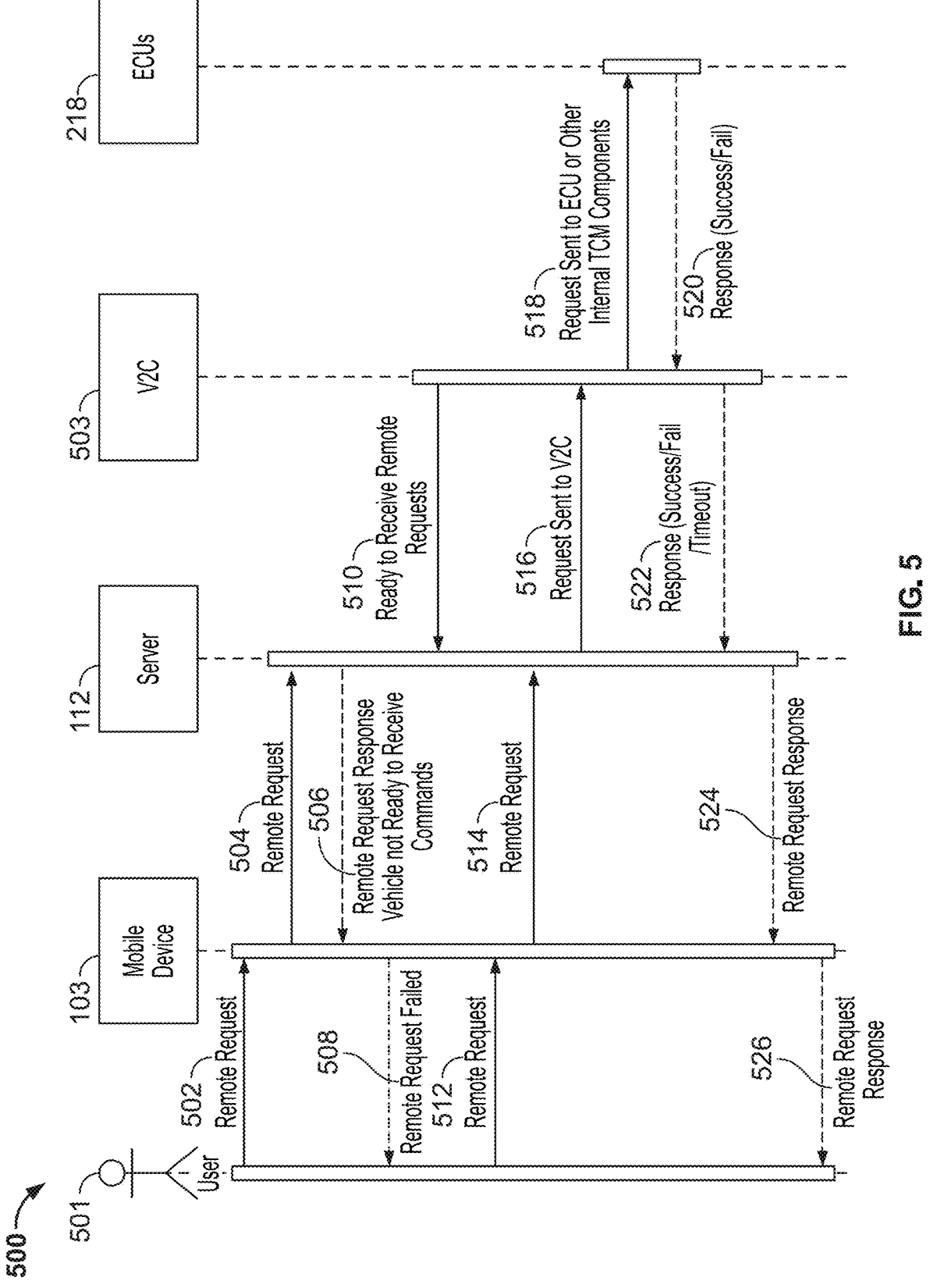
FIG. 5 is a block diagram representing transmission of data related to a client-initiated request and response, in accordance with some embodiments of the present disclosure.

FIG. 5 is a block diagram 500 representing transmission of data related to a client-initiated request and response, in accordance with some embodiments of the present disclosure. As shown, user 501 may input a remote request 502 using the mobile device 103. For example, the user 501 may input, in an application associated with the vehicle 101, a request for telemetry data of the vehicle 101. In response to the user 501 inputting the remote request 502, the mobile device 103 may transmit a signal 504 relaying the remote request to the server 112. If the server 112 determines that the vehicle 101 is not able to receive commands (e.g., the vehicle 101 is not in communication with the server 112), the server 112 may transmit a signal 506 to the mobile device 103 indicating that the vehicle 101 is not able to receive commands, and the mobile device 103 may inform the user with a corresponding notification 508. In some embodiments, if the server 112 determines that the vehicle 101 is not able to receive commands, the server 112 may determine if data corresponding to the remote request 502 is available, and, if the data is available, transmit the data to the mobile device 103.

When vehicle 101 is ready to receive remote request, V2C module 503 provides a signal 510 to the server 112. The V2C module 503 may be implemented by the V2C module 202 of FIG. 2 or the V2C module 302 of FIG. 3. Thereafter, if the user 501 inputs a remote request 512 using the mobile device 103, and a signal 514 relaying the remote request is received by the server 112, the server may relay the request to the V2C module 503 (massage 516). The V2C module 503 relays the request to the corresponding one of the ECUs 218 or TCM application, which attempts to execute the request and reports back to the V2C module 503 an indication 520 of whether or not the execution of the request was successful, along with the corresponding data. The V2C module 503 relays the indication 520 and corresponding data to the server 112 (message 522), which in turn relays the indication 520 and corresponding data to the mobile device 103 (message 524). The mobile device 103 may inform the user 501 with a notification 526 corresponding to the relayed indication 520 and the corresponding data. In some cases, for data transfer, the V2C module 503 may send a burst of traffic to catch up on messages when the V2C module 503 is connected to Wi-Fi or that could not be sent when the V2C module 503 was offline. In some cases, the server 112 should respond immediately to a request, acknowledging receipt of the request and perform any processing asynchronously in the background. If a response is not received within a certain timeout (e.g., 30 seconds), the data may be resent until the V2C module 503 gets a successful response from the server 112.

Figure 6:
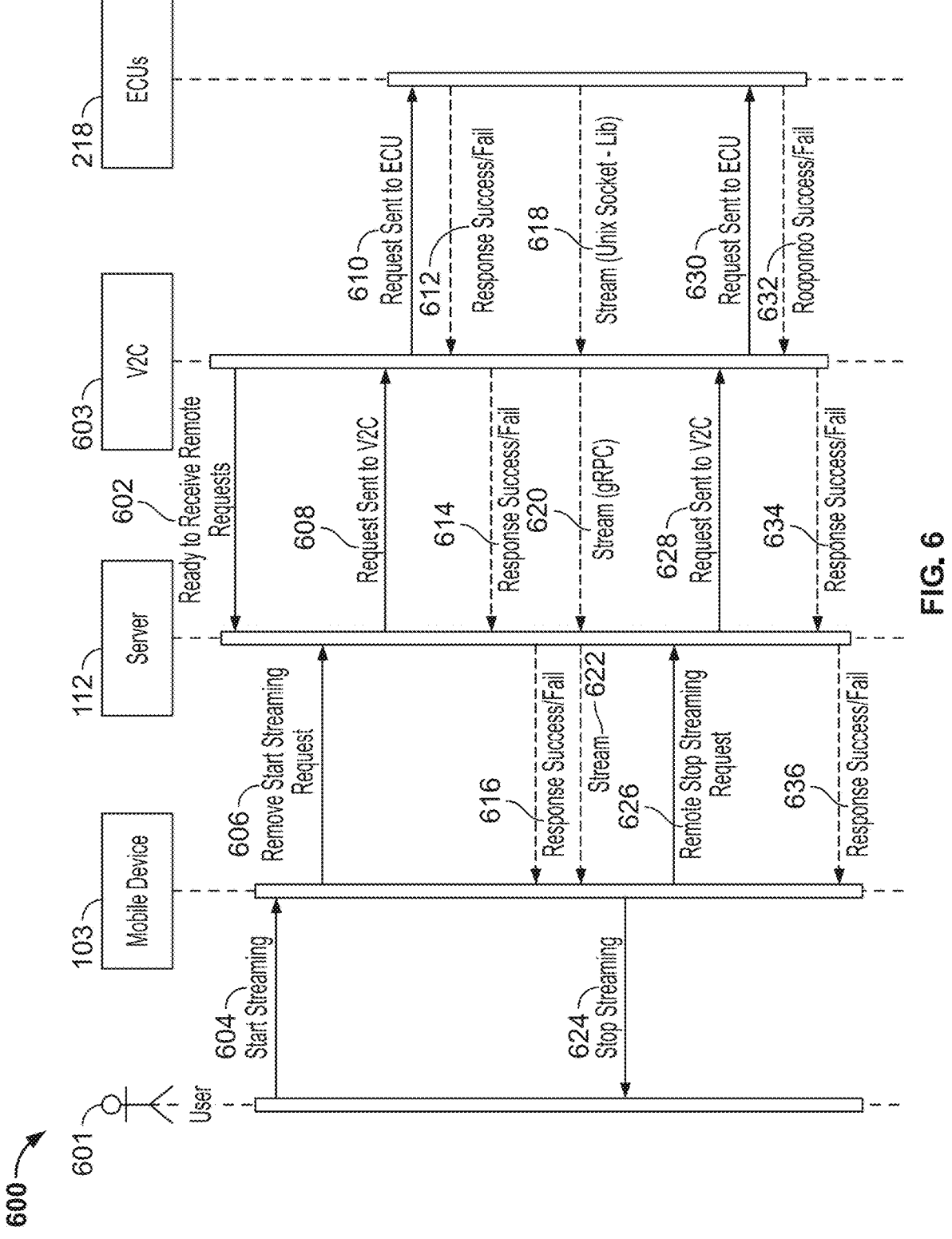
FIG. 6 is a block diagram representing transmission of data related to client-initiated streaming request, in accordance with some embodiments of the present disclosure.

FIG. 6 is a block diagram 600 representing transmission of data related to a client-initiated streaming request, in accordance with some embodiments of the present disclosure. As shown, user 601 may input a remote streaming request 604 using the mobile device 103. The remote streaming request 604 (a user-initiated streaming request) may be distinguished from, e.g., a mode of the vehicle, in which the vehicle 101 captures audio/video by monitoring an area around the vehicle 101 and uploads, by the TCM 102, the files to the server 112 once recording is complete. In response to the user 601 inputting the remote streaming request 604, the mobile device 103 may transmit a signal 606 relaying the remote streaming request to the server 112. If the server 112 determines that the vehicle 101 is able to receive commands (e.g., based on an indication 602 received from V2C module 603), the server 112 relays the request to the V2C module 603 (message 608). The V2C module 603 may be implemented by the V2C module 202 of FIG. 2 or the V2C module 302 of FIG. 3. The V2C module 603 relays the request to the corresponding ECU among the ECUs 218 of the vehicle (message 610). For example, the V2C module 603 relays the request to the ECU configured to implement a guard mode (e.g., for monitoring the area around the vehicle 101). The ECU returns an indication 612 of whether or not the request was successful to the V2C module 603, which relays the indication to the server 112 (message 614), which in turn relays the indication to the mobile device 103 (message 616).

If the ECU successfully initiates the requests stream, the ECU begins to stream the requested video/audio to the V2C module 603 (stream 618), which relays the stream to the server 112 (stream 620), which relays the stream to the mobile device 103 (stream 622). The stream continues to be provided to the mobile device 103 until a request 624 to stop streaming is received at the mobile device (or the steam fails). In some embodiments, the stream may continue until the user sends a stop request or until triggered by an internal rule (e.g., low battery). The mobile device 103 relays the stop streaming request 626 to the server 112, which relays the request to the V2C module 603 (request 628), which relays the request to the ECU (request 630). In response to receiving the request 630 to stop streaming, the ECU stops the stream and reports a result of the request (result 632) to the V2C module 603, which relays the result to the server 112 (result 634), which relays the result to the mobile device 103 (result 636). In this way, the user 601 can easily monitor the vehicle 101 from a remote location.

Figure 7:
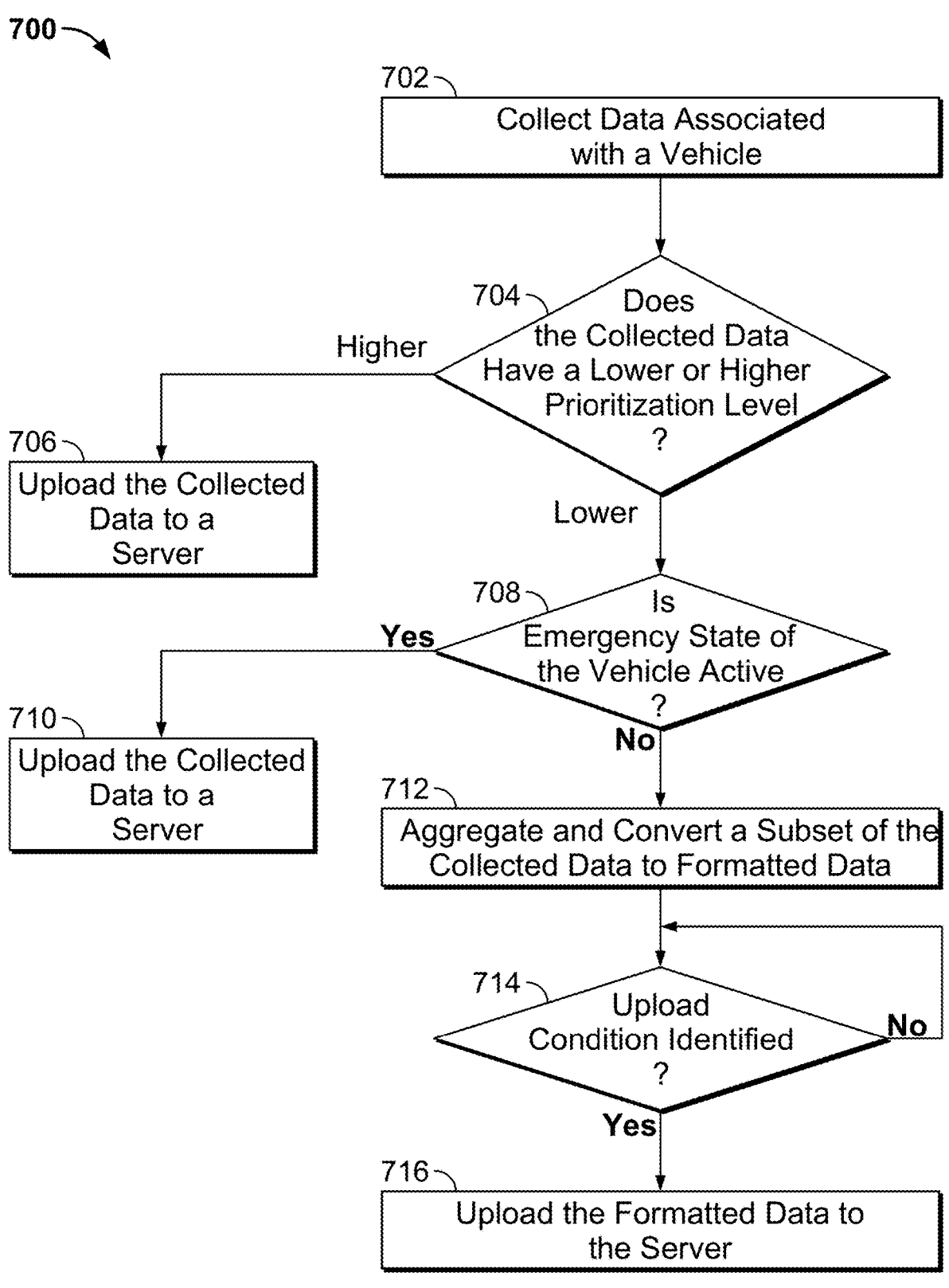
FIG. 7 shows a flowchart of an illustrative process for processing and uploading vehicle data, in accordance with some embodiments of the present disclosure.

FIG. 7 shows a flowchart of an illustrative process 700 for processing and uploading vehicle data, in accordance with some embodiments of the present disclosure. The process 700 may be performed by the TCM 102, and more specifically, by the V2C module 202 of FIG. 2 or the V2C module 302 of FIG. 3, which are implemented by the TCM 102.

At 702, the TCM 102 may collect vehicle data (e.g., raw vehicle data) associated with the vehicle 101. For example, as described above, the TCM 102 may continuously collect telemetry data (metrics data), file data (e.g., audio files, camera frames, etc.), diagnostic data, fault data, from the ECUs/TCM apps 110 of the vehicle 101. In some embodiments, the vehicle data may be collected by high-fidelity capture.

At 704, the TCM 102 may determine if the collected vehicle data has a higher prioritization level or a lower prioritization level, based on a data policy (e.g., data policy 212). For example, as described above, the TCM 102 may determine that certain, low-bandwidth/time-sensitive data that is to be displayed on the mobile device 103 associated with the vehicle 101 is vehicle data having the higher prioritization level, while other types of high-bandwidth data/time insensitive vehicle data having the lower prioritization level. In some embodiments, if the collected vehicle data is notification data to be displayed on the mobile device 103 (e.g., data such as door open, trunk open, vehicle charge level, lock state, vehicle status information, vehicle location, etc.), the TCM 102 may determine that the collected vehicle data has the higher prioritization level. Otherwise, the TCM 102 may determine that the collected vehicle data has the lower prioritization level. In one example, the vehicle data having the lower prioritization level may be log data to be stored in a time-series database. In another example, the vehicle data having the lower prioritization level may be any other data that is not determined to be the data having the higher prioritization level.

At 706, in response to determining that the collected vehicle data has the higher prioritization level ("higher" at 704), the TCM 102 may upload the collected vehicle data (e.g., non-aggregated, non-synthesized data) to the server 112 over the available connection to the server 112. For example, if a Wi-Fi connection is available, the TCM 102 may upload the collected vehicle data to the server 112 over the Wi-Fi connection. Otherwise, the TCM 102 may upload the collected vehicle data to the server 112 over a cellular connection (e.g., or other type of available connection).

At 708, in response to determining that the collected vehicle data has the lower prioritization level ("lower" at 704), the TCM 102 may determine if an emergency state of the vehicle 101 is active. For example, based on a signal from the fault manager module 226, the TCM 102 may determine that the emergency state is active when the hazard lights of the vehicle 101 are turned on, when the vehicle 101 enters a safe state (e.g., due to a detected crash, damage, malfunction, etc.), or when a battery management system (BMS) of the vehicle 101 enters a safe state (e.g., e.g., due to temperature, current, or voltage warning, thermal event, etc.). In response to determining that the emergency state is active ("Yes" at 708), the process 700 proceeds to 710. Otherwise ("No" at 708), the process 700 proceeds to 712.

At 710, in response to determining that the emergency state is active ("Yes" at 708), the TCM 102 uploads the collected vehicle data to the server 112 over any available connection (e.g., even if the vehicle 101 is not connected to the server 112 by a Wi-Fi connection). In some embodiments, the uploaded vehicle data may include any raw or high-fidelity vehicle data that may have been locally stored temporarily by the V2C module 202 before the emergency state was detected (e.g., 10 minutes before the emergency state was detected). Additionally, and based on the type of emergency, additional vehicle data may continue to be collected and uploaded for a period of time after determining the emergency state of the vehicle. The period of time for collecting and uploading the additional vehicle data may be based on the server using a machine learning model as applied to the specific emergency state of the current vehicle and prior diagnostic information from other vehicles.

At 712, in response to determining that the emergency state is not active ("No" at 708), the TCM 102 aggregates and converts a subset of the collected vehicle data to formatted data. As one example, the TCM 102 may continuously track the miles driven (e.g., once per second). However, instead of uploading this non-aggregated, non-synthesized data in real-time to the server 112 (e.g., as high-fidelity data), the TCM 102 may perform local edge computing to aggregate this data (e.g., one value representing the miles driven in the past day). In some embodiments, the aggregated data may include the number of city miles driven and the number of highway miles driven. The formatted data may be smaller (e.g., consumes less memory) than the collected (non-aggregated, non-synthesized) data. As another example, the TCM 102 may track vehicle resets and data associated with those vehicle resets. Periodically, the TCM 102 may aggregate this data as the total number of vehicle resets that occurred within a given timeframe. As another example, the TCM 102 may track vehicle limited performance events and data associated with those events. Periodically, the TCM 102 may aggregate this data as the total number of events that occurred within a given timeframe.

At 714, the TCM 102 may determine if an upload condition is identified. In some embodiments, the upload condition may be when the vehicle 101 is connected to the server 112 over a Wi-Fi network or at a scheduled time of day. In some embodiments, the upload condition may also be based on a user profile, network traffic/available cloud resources, a user action (e.g., a user opening (on the mobile device 103) an application associated with the vehicle), signal strength of the available connection, etc. In response to determining that the upload condition is identified ("Yes" at 714), the process 700 proceeds to 716. Otherwise ("No" at 714), the TCM 102 continues to monitor for the upload condition.

At 716, in response to the upload conduction being identified ("Yes" at 714), the TCM 102 facilitates uploading of the formatted data to the server.

The processes discussed above are intended to be illustrative and not limiting. One skilled in the art would appreciate that the steps of the processes discussed herein may be omitted, modified, combined and/or rearranged, and any additional steps may be performed without departing from the scope of the invention.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations thereto and modifications thereof, which are within the spirit of the following claims.

What is claimed is:

1. A method of uploading data from a vehicle to a network server associated with an entity, comprising:

collecting, by one or more processors of the vehicle, vehicle data associated with the vehicle;

determining, by the one or more processors based on a data type of the vehicle data associated with the vehicle, that a first portion of the vehicle data has a higher prioritization level and that a second portion of the vehicle data has a lower prioritization level;

in response to determining that the second portion of the vehicle data has the lower prioritization level and an emergency state of the vehicle is active, facilitating, at the vehicle, upload of the second portion of the vehicle data to the network server using a first communication network; and in response to determining that the second portion of the vehicle data has the lower prioritization level and the emergency state of the vehicle is not active, facilitating, at the vehicle, upload of the second portion of the vehicle data to the network server using a second communication network, wherein the second communication network is different than the first communication network.

2. The method of claim 1, further comprising:

in response to determining that the second portion of the vehicle data has the lower prioritization level and the emergency state of the vehicle is not active:

converting, by one or more modules associated with the vehicle, the second portion of the vehicle data to formatted data;

identifying an upload condition for uploading the formatted data to the network server; and in response to the upload condition being identified, facilitating upload of the formatted data to the network server.

3. The method of claim 2, further comprising analyzing, by the one or more modules associated with the vehicle, the second portion of the vehicle data to determine a subset of the second portion of the vehicle data that can be aggregated and converted to the formatted data.

4. The method of claim 2, wherein the formatted data consumes less memory than the collected vehicle data.

5. The method of claim 2, wherein the upload condition is a scheduled time or when the vehicle is connected to the network server by Wi-Fi.

6. The method of claim 2, wherein facilitating the upload of the formatted data to the network server comprises facilitating the upload of the formatted data over a Wi-Fi connection.

7. The method of claim 1, wherein determining that the emergency state of the vehicle is active comprises determining that hazard lights of the vehicle are turned on, that the vehicle is in a safe state, or that a battery management system of the vehicle is in a safe state.

8. The method of claim 1, wherein:

the first portion of the vehicle data having the higher prioritization level is notification data to be displayed on a mobile device associated with the vehicle; and the second portion of the vehicle data having the lower prioritization level is log data to be stored in a time-series database.

9. The method of claim 1, further comprising facilitating upload of the first portion of the vehicle data to the network server over a cellular connection.

10. A system, comprising:

a memory storing instructions; and control circuitry configured to execute the instructions stored in the memory to:

collect vehicle data associated with a vehicle;

determine based on a data type of the vehicle data associated with the vehicle that a first portion of the vehicle data has a higher prioritization level and that a second portion of the vehicle data has a lower prioritization level;

in response to determining that the second portion of the vehicle data has the lower prioritization level and an emergency state of the vehicle is active, facilitate upload of the second portion of the vehicle data to the network server using a first communication network; and in response to determining that the second portion of the vehicle data has the lower prioritization level and the emergency state of the vehicle is not active, facilitate upload of the second portion of the vehicle data to the network server using a second communication network, wherein the second communication network is different than the first communication network.

11. The system of claim 10, wherein the control circuitry is further configured, in response to determining that the second portion of the vehicle data has the lower prioritization level and the emergency state of the vehicle is not active, to:

convert the second portion of the vehicle data to formatted data;

identify an upload condition for uploading the formatted data to the network server; and in response to the upload condition being identified, facilitate upload of the formatted data to the network server.

12. The system of claim 11, wherein the control circuitry is further configured to analyze the second portion of the vehicle data to determine a subset of the second portion of the vehicle data that can be aggregated and converted to the formatted data, wherein the formatted data consumes less memory than the collected vehicle data.

13. The system of claim 11, wherein the upload condition is a scheduled time or when the vehicle is connected to the network server by Wi-Fi.

14. The system of claim 11, wherein the control circuitry is configured to facilitate the upload of the formatted data to the network server by facilitating the upload of the formatted data over a Wi-Fi connection.

15. The system of claim 10, wherein the control circuitry is configured to determine that the emergency state of the vehicle is active by determining that hazard lights of the vehicle are turned on, that the vehicle is in a safe state, or that a battery management system of the vehicle is in a safe state.

16. The system of claim 10, wherein:

the first portion of the vehicle data having the higher prioritization level is notification data to be displayed on a mobile device associated with the vehicle; and the second portion of the vehicle data having the lower prioritization level is log data to be stored in a time-series database.

17. The system of claim 10, wherein the control circuitry is further configured to execute the instructions stored in memory to facilitate upload of the first portion of the vehicle data to the network server over a cellular connection.

18. A non-transitory computer-readable medium having non- transitory computer-readable instructions encoded thereon that, when executed by control circuitry, causes the control circuitry to:

collect vehicle data associated with a vehicle;

determine based on a data type of the vehicle data associated with the vehicle that a first portion of the vehicle has a higher prioritization level and that a second portion of the vehicle data has a lower prioritization level;

in response to determining that the second portion of the vehicle data has the lower prioritization level and an emergency state of the vehicle is active, facilitate upload of the second portion of the vehicle data to the network server using a first communication network; and in response to determining that the second portion of the vehicle data has the lower prioritization level and the emergency state of the vehicle is not active, facilitate upload of the second portion of the vehicle data to the network server using a second communication network, wherein the second communication network is different than the first communication network.

19. The non-transitory computer-readable medium of claim 18, wherein in response to determining that the second portion of the vehicle data has the lower prioritization level and the emergency state of the vehicle is not active, the instructions further cause the control circuitry to:

convert the second portion of the vehicle data to formatted data;

identify an upload condition for uploading the formatted data to the network server; and in response to the upload condition being identified, facilitate upload of the formatted data to the network server, wherein the formatted data consumes less memory than the collected vehicle data.

20. The non-transitory computer-readable medium of claim 19, wherein the upload condition is a scheduled time or when the vehicle is connected to the network server by Wi-Fi.

\* \* \* \* \*